United States Patent [19]

Sasaki et al.

[11] Patent Number: 5,020,406

[45] Date of Patent: Jun. 4, 1991

[54] MITER SAW

[75] Inventors: Katsuhiko Sasaki; Hisashi Higuchi, both of Anjo, Japan

[73] Assignee: Makita Electric Works, Ltd., Anjo, Japan

[21] Appl. No.: 549,072

[22] Filed: Jul. 6, 1990

[30] Foreign Application Priority Data

Jul. 7, 1989 [JP] Japan .................................. 1-176410

[51] Int. Cl.$^5$ .............................................. B23D 45/04
[52] U.S. Cl. ........................................ 83/397; 83/478; 83/490; 83/581
[58] Field of Search ................. 83/397, 478, 490, 484, 83/581, 582, 588, DIG. 1, 471.2, 471.3; 30/390, 391

[56] References Cited

U.S. PATENT DOCUMENTS

| | | | |
|---|---|---|---|
| 2,517,485 | 8/1950 | Henning | 83/397 |
| 4,318,324 | 3/1982 | Hall et al. | 83/397 |
| 4,581,966 | 4/1986 | Kaiser et al. | 83/397 |
| 4,774,866 | 10/1988 | Dehari et al. | 83/397 |
| 4,799,416 | 1/1989 | Kumasaka et al. | 83/397 |
| 4,805,504 | 2/1989 | Fushiya et al. | 83/397 |

Primary Examiner—Frank T. Yost
Assistant Examiner—Scott A. Smith
Attorney, Agent, or Firm—Dennison, Meserole, Pollack & Scheiner

[57] ABSTRACT

A miter saw has a base on which a workpiece is placed, a miter saw unit substantially vertically pivotally mounted on the base, a drive supported by the miter saw unit for driving a rotary tool, a blade case mounted on the miter saw unit and partly covering the rotary tool so as to provide an exposed operational portion of the rotary tool, a safety cover pivotally mounted on the blade case for covering the exposed operational portion of the rotary tool, and an actuating link having a slot formed substantially the central portion thereof. One end of the actuating link is pivotally connected with the base, while the other end of the actuating link is engaged with the safety cover. A guide member is mounted on the blade case and is engaged with the slot of the actuating link. The safety cover is pivoted to uncover the exposed operational portion of the rotary tool in association with the movement of the engaging portion of the slot with the guide member as the miter saw unit is pivoted downwardly toward the base.

6 Claims, 13 Drawing Sheets

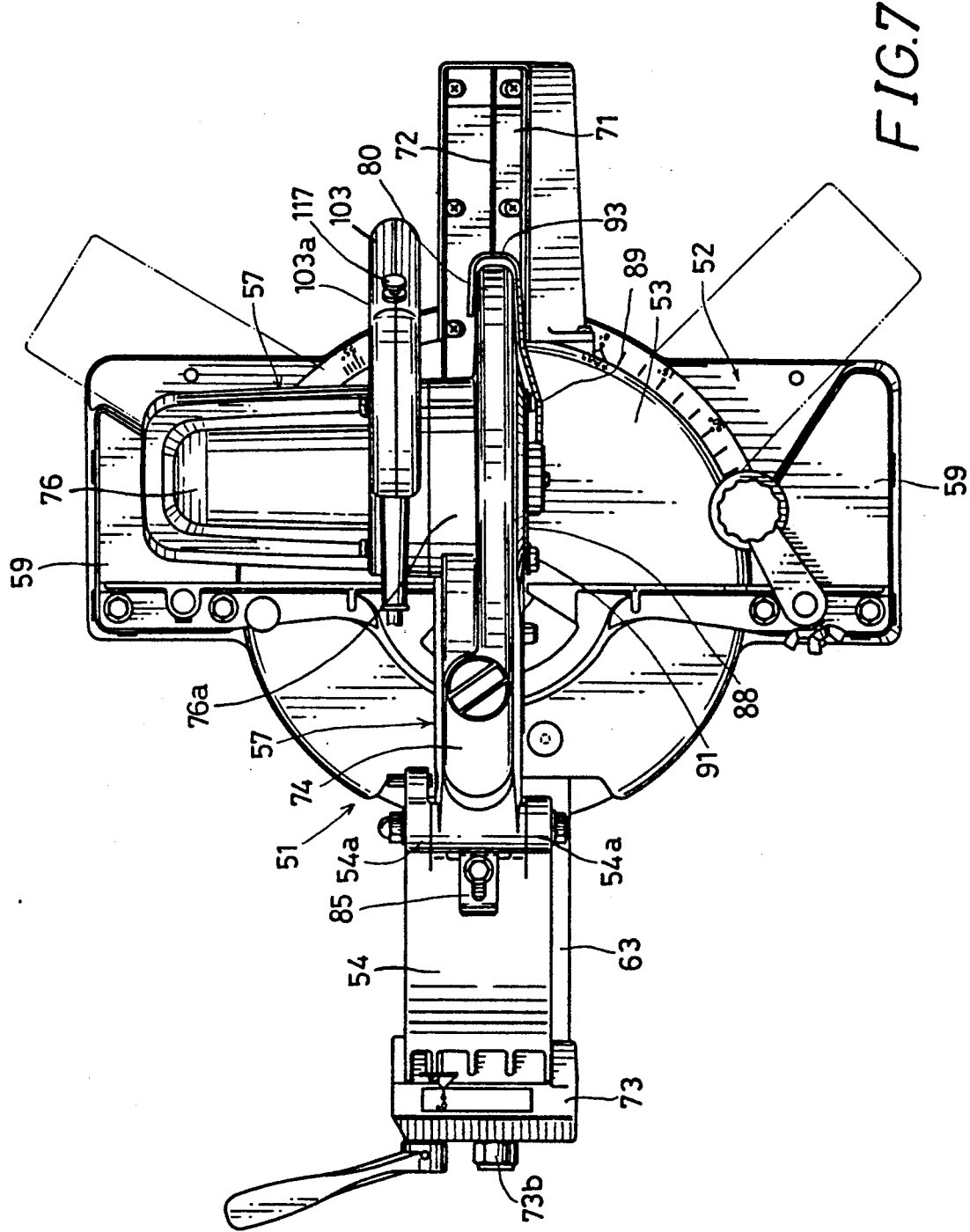

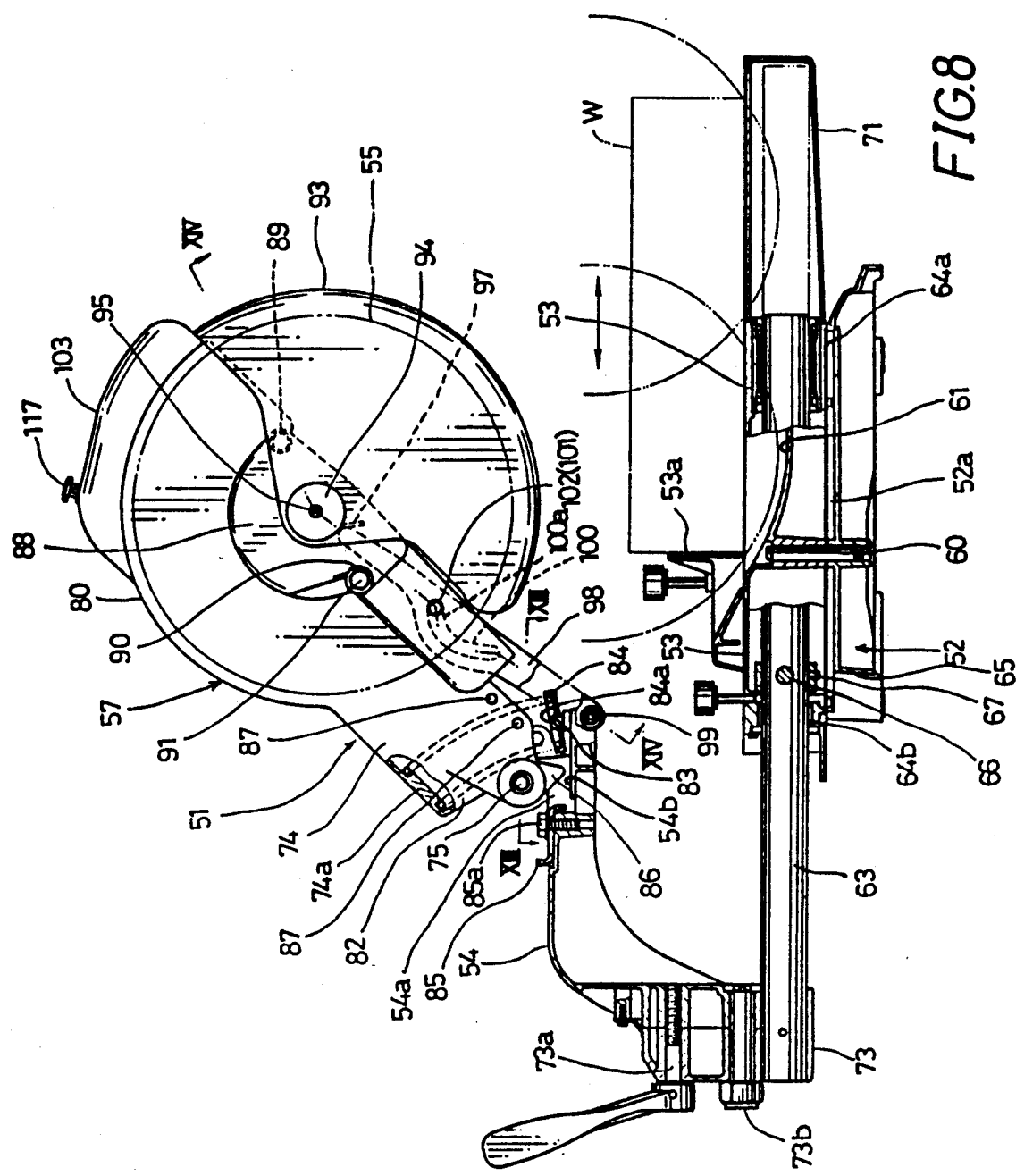

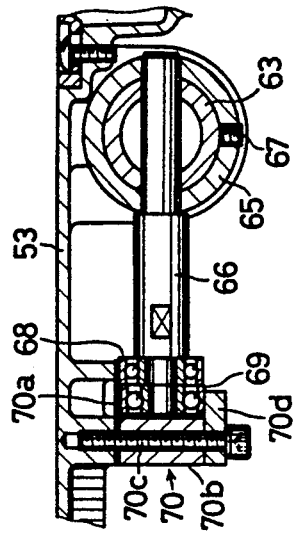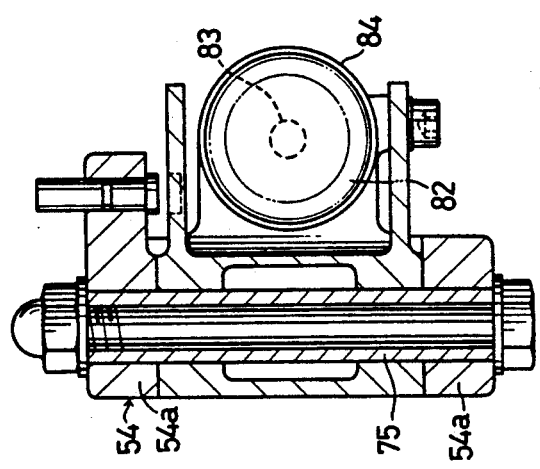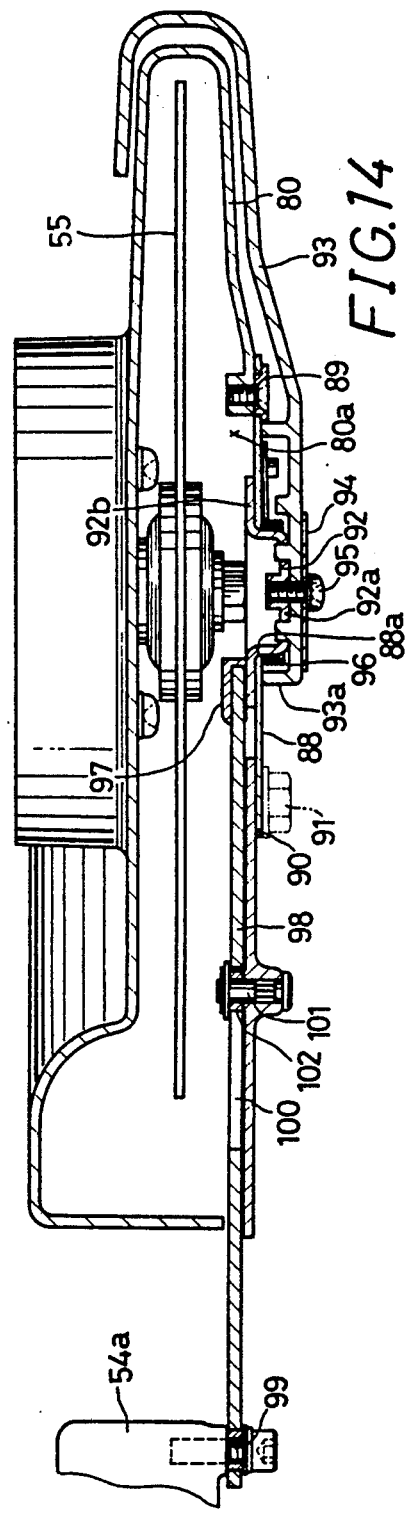

MITER SAW

BACKGROUND OF THE INVENTION

1. Field of the Invention

The present invention relates to a miter saw which includes a miter saw unit having drive means for driving a rotary tool such as a circular saw blade and adapted to be vertically pivoted relative to the upper surface of a base on which a workpiece is placed so as to carry out cutting or similar operations of the workpiece on the base.

2. Description of the Prior Art

Conventional miter saws generally include a miter saw unit having drive means for driving a rotary tool such as a circular saw blade and adapted to be vertically pivoted relative to the upper surface of a base on which a workpiece is placed. The miter saw unit is formed with a blade case covering the rotary tool with a part of the rotary tool exposed outwardly. A safety cover is pivotally mounted on the blade case for covering an exposed part of the rotary tool. The safety cover is positively pivoted in response to the pivotal movement of the miter saw unit.

Means for positively pivoting the safety cover is disclosed in Japanese Laid-Open Patent Publication No. 63-169217.

This publication discloses an actuating link which is pivotally supported at the central portion thereof by a blade case. Both ends of the actuating link are connected with an arm fixed to the base and the safety cover, respectively, through cam means such as a cam slot or a cam surface.

Such conventional means requires to form cam means between one end of the actuating link and the arm and between the other end of the actuating link and the safety cover. The formation of the cam means must be made considerably preciously and is rather complicated, Furthermore, in case of assembling, it requires complicated work.

SUMMARY OF THE INVENTION

It is, accordingly, an object of the present invention to provide a miter saw in which means for positively pivoting a safety cover in response to the pivotal movement of a miter saw unit can be easily assembled by a simple operation.

It is another object of the present invention to provide a miter saw which is simple in construction and ensures smooth rotational movement of a safety cover.

According to the present invention, there is provided a miter saw comprising:

a base on which a workpiece is placed;

a miter saw unit substantially vertically pivotally mounted on the base;

drive means supported by the miter saw unit for driving a rotary tool;

a blade case mounted on the miter saw unit and partly covering the rotary tool so as to provide an exposed operational portion of the rotary tool;

a safety cover pivotally mounted on the blade case for covering the exposed operational portion of the rotary saw blade;

an actuating link having a slot formed substantially in the central portion thereof, one end of the actuating link being pivotally connected with the base, while the other end of the actuating link being engaged with the safety cover; and a guide member mounted on the blade case and engaged with the slot of the actuating link.

Whereby the safety cover is pivoted to uncover the exposed operational portion of the rotary tool in association with the movement of the engaging position of the slot with the guide member as the miter saw unit is pivoted downwardly toward the base.

Preferably, the other end of the actuating link is extended adjacent the safety cover as a free end and the safety cover is biased by a spring in a direction in which the range of covering the exposed operational portion of the rotary tool is increased so as to engage the other end of the actuating link, so that the safety cover is pivoted to uncover the exposed operational portion of the rotary tool against the biasing force of the spring as the miter saw unit is pivoted downwardly.

The blade case may include a cutout portion formed generally in opposed relation to the central portion of the rotary tool. A mounting plate is releasably mounted on the blade case so as to open or close the cutout portion. The mounting plate has an opening formed in opposed relation to the central portion of the rotary tool. A mounting cap is pivotally fitted in the opening of the mounting plate and the safety cover is mounted on the mounting cap so as to rotate therewith. The spring is a spiral spring which is fixed to the mounting plate at one end and is fixed to the safety cover at the other end. The safety cover is engaged by the other end of the actuating link via an engaging plate mounted on the mounting cap.

The slot of the actuating link extends substantially in a longitudinal direction thereof and is curved upwardly with respect to the pivotal direction of the miter saw unit. The slot is formed on the side of the other end of the actuating link with a portion which is smaller in radius of curvature than the the other portion.

The guide member may be a roller rotatably mounted on the blade case through a support shaft The invention will become more fully apparent from the claims and the description as it proceeds in connection with the drawings.

BRIEF DESCRIPTION OF THE DRAWINGS

FIG. 7 shows a plan view of a miter saw according to a second embodiment of the present invention;

FIG. 8 is a front view partly in section of the miter saw shown in FIG. 7

FIG. 12 is an enlarged sectional view of a portion P shown in FIG. 11;

FIG. 13 is an enlarged sectional view taken along line XIII—XIII in FIG. 8;

FIG. 14 is an enlarged sectional view taken along line XIV—XIV in FIG. 8; and

DETAILED DESCRIPTION OF THE PREFERRED EMBODIMENT

Figure 1:
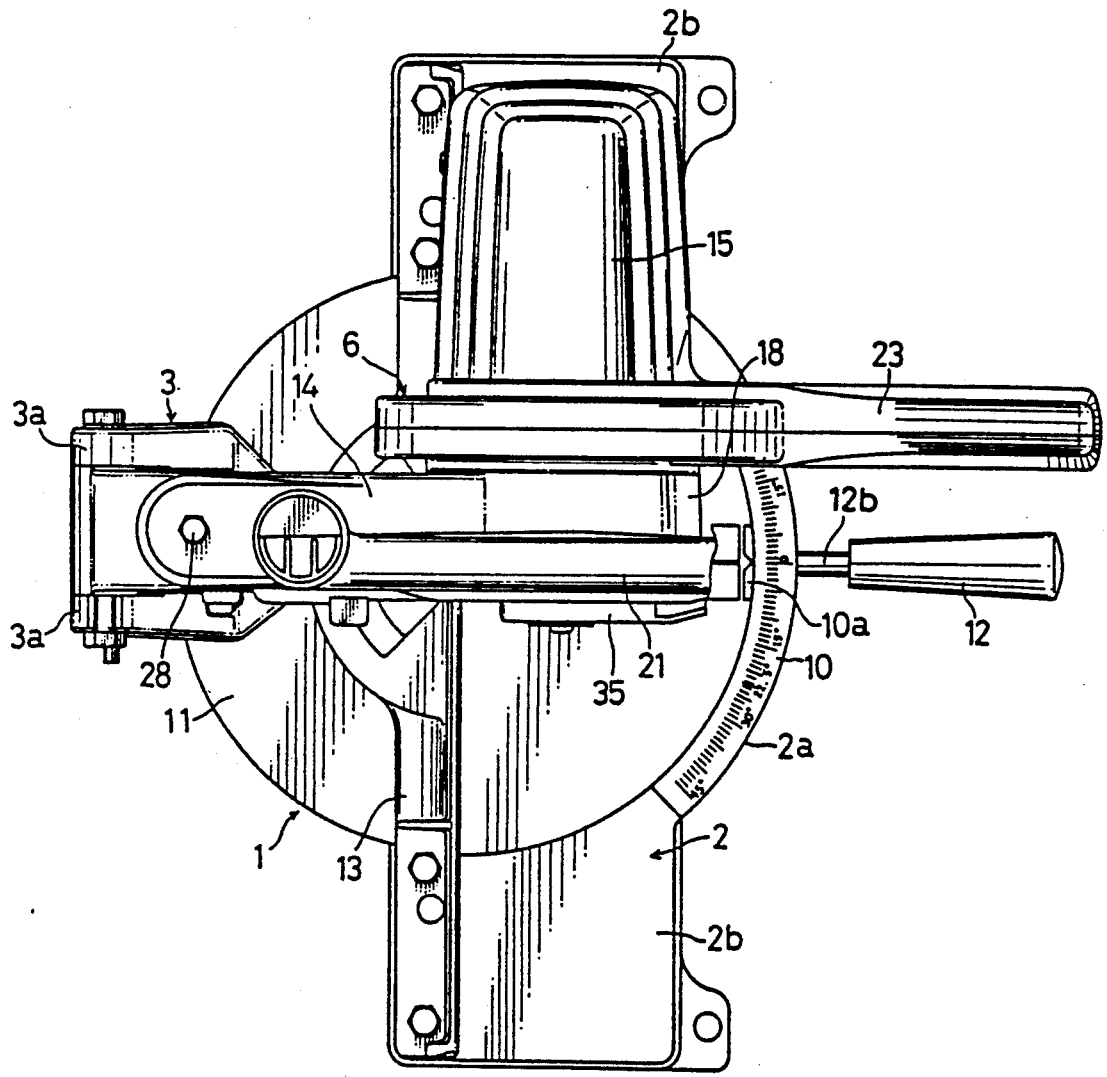
FIG. 1 is a plan view of miter saw according to a first embodiment of the present invention.

Now, a first embodiment of the present invention will be described with reference to FIGS. 1 to 6. As shown in the drawings, a miter saw generally designated by numeral 1 is mainly comprised of a base having a base body 2 on which a workpiece W is to be carried and a fixed arm 3 mounted vertically to the base body 2, and a miter saw unit 6 connected to the fixed arm 3 vertically pivotally along a vertical path relative to the base body 2 and including a rotary tool 4 such as a circular saw blade and drive means 5 for driving the rotary tool 4.

Figure 2:
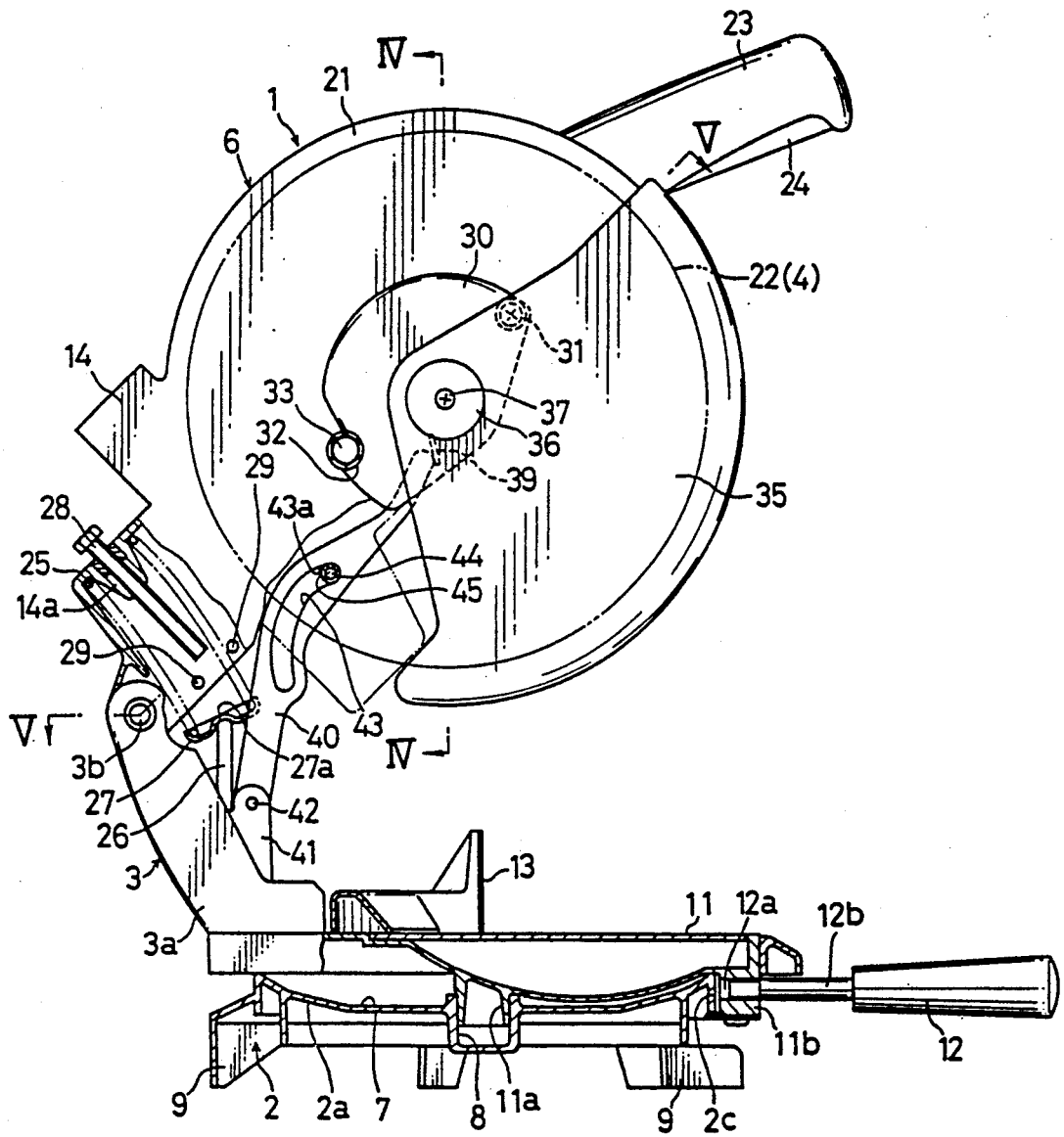
FIG. 2 is a front view partly in section of the miter saw shown in FIG. 1.
Figure 3:
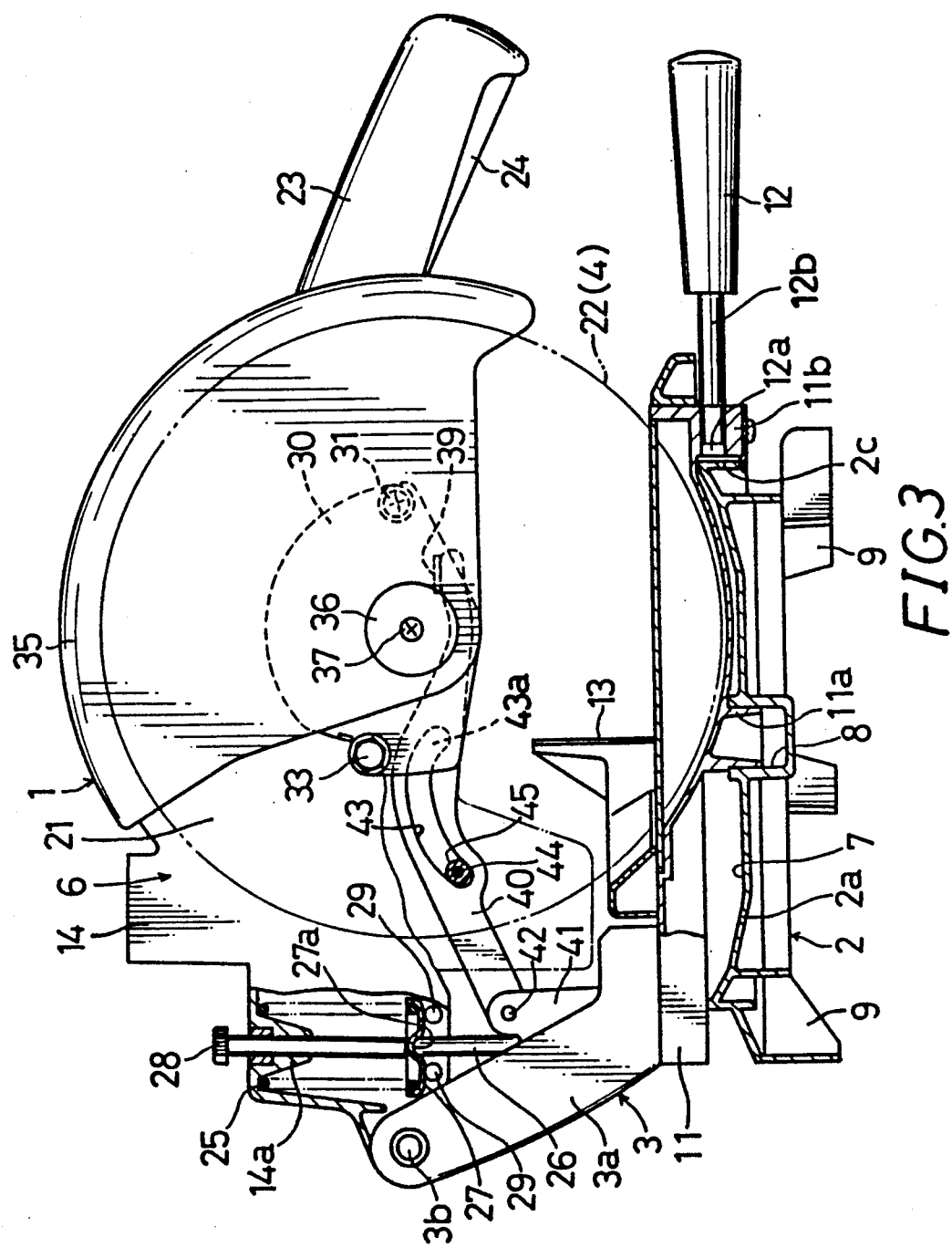
FIG. 3 is a front view similar to FIG. 2, but showing the miter saw unit in the operational position.

As shown in FIGS. 1 and 2, the base body 2 is a plate-like member including a circular portion 2a on which a turntable 11 is placed as will be hereinafter described and two rectangular portions 2b extending from both sides of the circular portion 2a and adapted to support a workpiece W thereon. The circular portion 2a has on the upper surface thereof a dish-like concave portion 7 and is integrally formed with a bearing hole 8 extending substantially from the central portion of the concave portion 7 and adapted to support the pivotal shaft of the turntable 11 which will be described later. The base body 2 is integrally formed with relatively short legs 9 extending from the bottom surface of the base body 2. The circular portion 2a has an opening at the bottom surface of the side adjacent the operator (hereinafter referred to as front side) and is formed with a vertical abutment surface 2c. The upper surface of the abutment surface 2c is marked with calibrations 10 substantially in the range of 45° to the central position at 0° in the right and left (upward and downward in FIG. 1) directions.

The turntable 11 is disposed on the circular portion 2a of the base and is received in the concave portion 7. The turntable 11 extends over the upper surface of the concave portion 7 and is provided at the central portion of the bottom surface thereof with a shank 11a fitted in the bearing hole 8 for pivotal movement. The turntable 11 has a bulged portion 11b projecting downwardly from the circular portion 2a of the turntable 11 on the front side thereof and fitted in the opening of the circular portion 2a in opposed relation to the abutment surface 2c. A lever 12 for fixing the turntable 11 has a threaded shaft 12b which is threadedly inserted in the central portion of the bulged portion 11b of the turntable 11. The threaded shaft 12b of the lever 12 has an end surface disposed in opposed relation to the abutment surface 2c of the base body 2 so as to be pressed thereagainst through a pin 12a of a synthetic resin. With this construction, the turntable 11 is pivotable in the range of 45° to the central position of the circular portion 2a of the base body 2 adjacent the operator in the right and left (upward and downward in FIG. 1) directions, and can be fixed by threadedly advancing the lever 12 which causes the threaded shaft 12b to be pressed through the synthetic resin pin 12a against the abutment surface 2c of the base body 2. An index member 10a is provided on the upper surface of the turntable 11 in alignment with the lever 12, so that it can cooperate with the calibrations 10 to indicate the degree (angle) of the pivotal movement of the turntable 11. With the above construction of the base body 2 and the mounting structure of the turntable 11 on the base body 2, the turntable 11 can be easily mounted onto the base body 2, without extending the lever 12 nearly to the central portion of the base body 2. The turntable 11 has at the central portion thereof a recess for receiving a circular saw blade which will be described later.

A fence member 13 is disposed over the upper surfaces of the rectangular portion 2b of the base body 2 and the turntable 11 for guiding the side surface of a workpiece W.

The fixed arm 3 is vertically mounted on the upper surface of the turntable 11 on the side apart from the operator (hereinafter referred to as rear side). The fixed arm 3 includes two arm members 3a extending upwardly in an inclined manner and having upper ends between which a unit housing 14 of the miter saw unit 6 is vertically pivotally supported at the rear end thereof through a support shaft 3b.

A motor housing 15 is mounted on the unit housing 14 of the miter saw unit 6 perpendicularly to the unit housing 14 or longitudinally of the base body 2, and an electric motor 16 constituting the drive means 5 is encased in the motor housing 15. The motor 16 has a motor shaft 17 extending into a gear housing 18 attached to the motor housing 15 in which the motor shaft 17 is in mesh with a reduction gear 19. The reduction gear 19 has an output shaft 20 extending into a blade case 21 attached to the gear housing 18 in which a circular saw blade 22 is exchangeably mounted on the end of the output shaft 20. The blade case 21 is so designed as the cover substantially half the circular saw blade 22. The motor housing 15 is formed with a control handle 23 which projects from a portion of the periphery thereof in the same direction as the unit housing 14. The control handle 23 is provided with a trigger 24 for operating a switch (not shown) to start or stop the electric motor 16.

The unit housing 14 of the miter saw unit 6 has a rear end portion in form of a box having an open bottom and integrally formed at the upper inside wall with a spring support portion 14a substantially in form of a downwardly projecting cone. A compression spring 25 is disposed in the interior of the box at the rear end of the unit housing 14 so as to normally urge the miter saw unit 6 for upward swinging movement, and extends in the direction of the swinging movement. The compression spring 25 has one end (upper end in FIG. 2) loosely held by the spring support portion 14a and the other end (lower end in FIG, 2) held by the upper surface of a dish-like support member 27 supported by a support pin 26 which extends vertically from the upper surface of the lower portion of the fixed arm 3. As shown in FIG. 2, the support member 27 is formed at the central portion of the lower surface thereof with a semispherical recess 27a in which a corresponding semispherical upper end of the support pin 26 is fitted. With this arrangement, the support member 27 holding the lower end of the compression spring 25 is pivotally supported for swinging movement in a plane relative to the support pin 26 in response to the movement of the compression spring 25. A threaded rod stopper 28 is threaded from upward through the conical spring support portion 14a so as to restrict the extent of the downward swinging movement of the miter saw unit 6. The threaded rod stopper 28 has a lower end disposed in opposed relation to the projection at the central portion of the upper surface of the support member 27 so as to be brought in abutting engagement against the projection. The extent of the upward swinging movement of the miter saw unit 6 is restricted by an arrangement comprising a control slot 43 formed in an actuating link 40 which will be described later and a guide roller 45 supported in the control slot 43 through a support shaft 44, substantially as shown in FIG. 2.

The unit housing 14 has two through holes 29 disposed substantially below the compression spring 25 and used for assembling of the compression spring 25. In assembling the compression spring 25, prior the mounting of the unit housing 14 of the miter saw unit 6 on the fixed arm 3, the compression spring 25 is fitted in compressed condition in the unit housing 14, with one end loosely supported by the spring support portion 14a. Then, pins of an assembling tool (not shown) are inserted through the through holes 29 to have the other end of the compression spring 25 held through the support member 27, so that the compression spring 25 may be kept in the compressed condition. With the spring 25 kept in this condition, the unit housing 14 is attached to the fixed arm 3, and the upper end of the support pin 26 is fitted in the recess 27a of the support member 27. Then, the pins of the assembling tool (not shown) are extracted from the through holes 29 to complete assembling of the compression spring 25 and the support member 27. In case the biasing force of the compression spring 25 is relatively small, the assembling process as described above will not be necessary, but the compression spring 25 can be directly assembled to a predetermined position.

Figure 4:
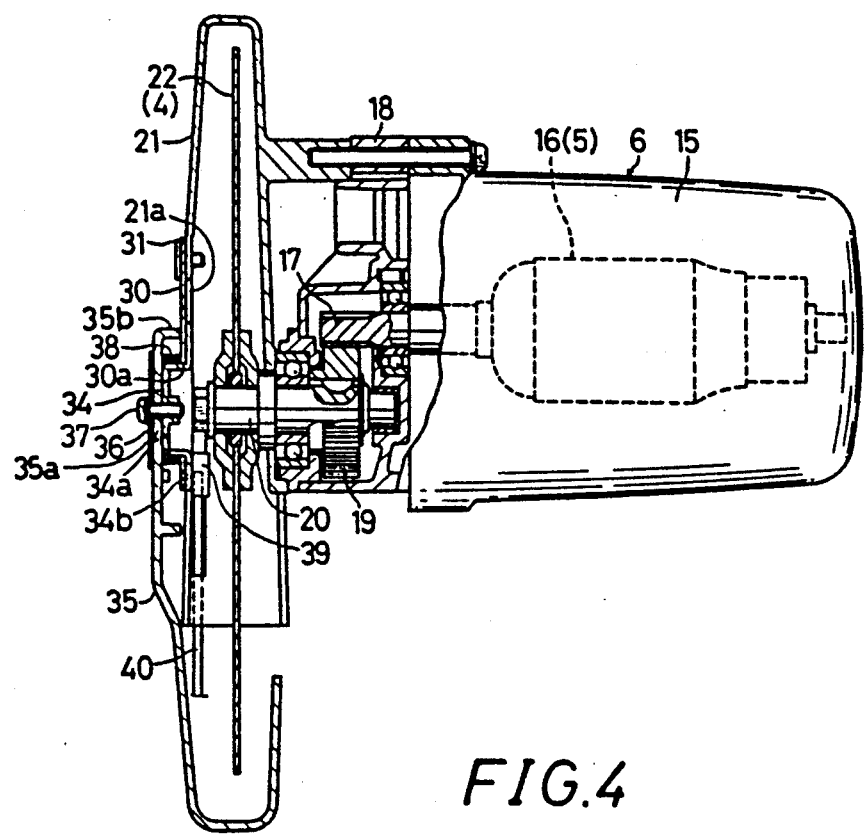
FIG. 4 is an enlarged sectional view taken along line IV—IV in FIG. 2.
Figure 5:
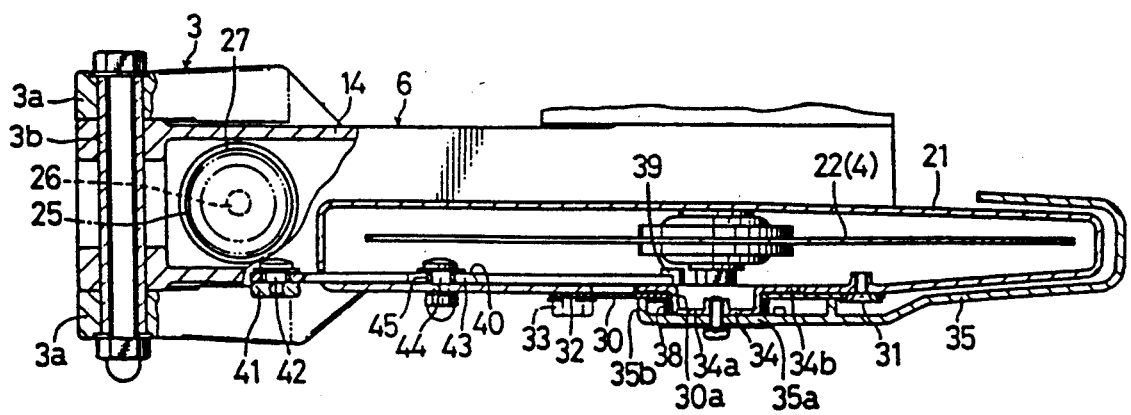
FIG. 5 is an enlarged sectional view taken along line V—V in FIG. 2.

As shown in FIGS. 4 and 5, the blade case 21 has a cutout portion 21a formed generally in opposed relation to the central mounting portion of the saw blade 22. A substantially elliptical mounting plate 30 is provided generally in opposed relation to the cutout portion 21a and is adapted to mount a safety cover which will be described later. Specifically, the mounting plate 30 is pivotally supported at one end to the blade case 21 through a support screw 31, and the other end of the mounting plate 30 forms a hooked engaging portion 32 which is releasably fastened to the blade case 21 by a locking bolt 33. The mounting plate 30 has a large-diameter central opening 30a formed in alignment with the central mounting portion of the saw blade 2. A mounting cap 34 serving as a central cap is rotatably fitted in the opening 30a. The mounting cap 34 has a flange portion 34b disposed in abutment with the rear surface of the mounting plate 30 and a boss portion 34a projecting outwardly through the opening 30a. A substantially sectorial safety cover 35 is provided and is adapted to cover from outside of the blade case 21 a portion of the saw blade 22 exposed from the blade case 21. Specifically, the safety cover 35 has a central mounting portion 35a and an inwardly bent portion 35b formed at the end thereof, and is fixedly fastened to the mounting cap 34 through a washer 36 by a screw 37, having the central mounting portion 35a disposed in abutment with the front surface of the boss portion 34a of the mounting cap 34 and the bent portion 35b in contact with the mounting plate 30. With this arrangement, the safety cover 35 is pivotable along with the mounting cap 34 about the opening 30a of the mounting plate 30 relative to the blade case 21. The boss portion 34a of the mounting cap 34 is encircled by a spiral spring 38 having one end fixed to the mounting plate 30 and the other end to the safety cover 35 and adapted to impart to the safety cover 35 biasing force in a clockwise direction in FIG. 2 to cause swinging return movement thereof, so that the safety cover 35 may normally cover from outside of the blade case 21 the portion of the saw blade 22 exposed from the blade case 21.

The mounting cap 34 is provided at the rear surface of the flange portion 34b with an engaging plate 39 projecting therefrom and adapted to be abuttingly engaged with one end of the actuating link 40. Specifically, as shown in FIG. 2, the actuating link 40 has the one end located in the blade case 21 in opposed relation to the control plate 39 so as to be brought in abutting engagement therewith and the other end pivotally connected through a support pin 42 to the upper end of a bracket 41 vertically extending from the upper surface of the lower portion of the fixed arm 3. The actuating link 40 has substantially in the central portion thereof an arcuate control slot 43 which extends in the longitudinal direction of the actuating link 40 and is curved upwardly with respect to the pivotal direction of the actuating link 40. A guide roller 45 is supported on the blade case 21 through a support shaft 44 and rotatably fitted in the control slot 43. The control slot 43 has at one end thereof an arcuate portion 43a whose radius of curvature is smaller than that of the other arcuate portion. As the unit housing 14 of the miter saw unit 6 is pivotally lowered, the actuating link 40 thus constructed is pivoted about the support pin 42 of the bracket 41 by the movement of the engaging position of the control slot 43 with the guide roller 45 and, through the one end of the actuating link 40 in abutting engagement with the control plate 39 of the mounting cap 34, the actuating link 40 causes the safety cover 35 along with the mounting cap 34 to be pivoted counterclockwise in FIG. 2 against the biasing force of the spiral spring 38, so that the cutting edge of the saw blade 22 is exposed.

The operation of the miter saw thus constructed will now be described with reference to FIGS. 6A to 6D.

With the miter saw in the position shown in FIG. 2 (FIG. 6A), a workpiece W to be cut is put on the base body 2 and properly clamped by clamping means (not shown), and the drive motor 16 is driven to rotate the saw blade 22. As the operator manually lowers or pushes down the miter saw unit 6 through the control handle 23 toward the base body 2 and the compression spring 25 is further compressed, the miter saw unit 6 is swung relative to the fixed arm 3 toward the base body 2 along a pivotal path about the support shaft 3b. During this movement, the compression spring 25 is wholly so deformed as to be further compressed. As the support member 27 holding the lower end of the spring 25 is pivotally supported by the support pin 26 for swinging movement in a plane, it can be pivoted in response to any distortion of the spring 25 so as to hold the whole lower end surface of the spring 25 at all times.

As the miter saw unit 6 is swung, the actuating link 40 is pivoted in the same direction about the support pin 42 of the bracket 41 under the control of the guide roller 45 fitted in the control slot 43. When the miter saw unit 6 is downwardly swung from the position shown in FIG. 6A, since the arcuate portion 43a of the control slot 43 at the one end thereof is smaller in radius of curvature than the other arcuate portion, the pivotal movement of the actuating link 40 is performed rapidly through a large angle. As the pivoting actuating link 40 has the one end kept in abutting engagement with the engaging plate 39 of the mounting cap 34, the pivotal movement of the actuating link 40 causes the engaging plate 39 to be pushed to impart rotational force to the mounting cap 34, so that the safety cover 35 along with the mounting cap 34 is pivoted counterclockwise in FIG. 2 about the opening 30a of the mounting plate 30 against the biasing force of the spiral spring 38. Thus, the cutting edge of the circular saw blade 22 is rapidly and widely exposed for starting the cutting operation (See FIG. 6B).

Figure 6A:
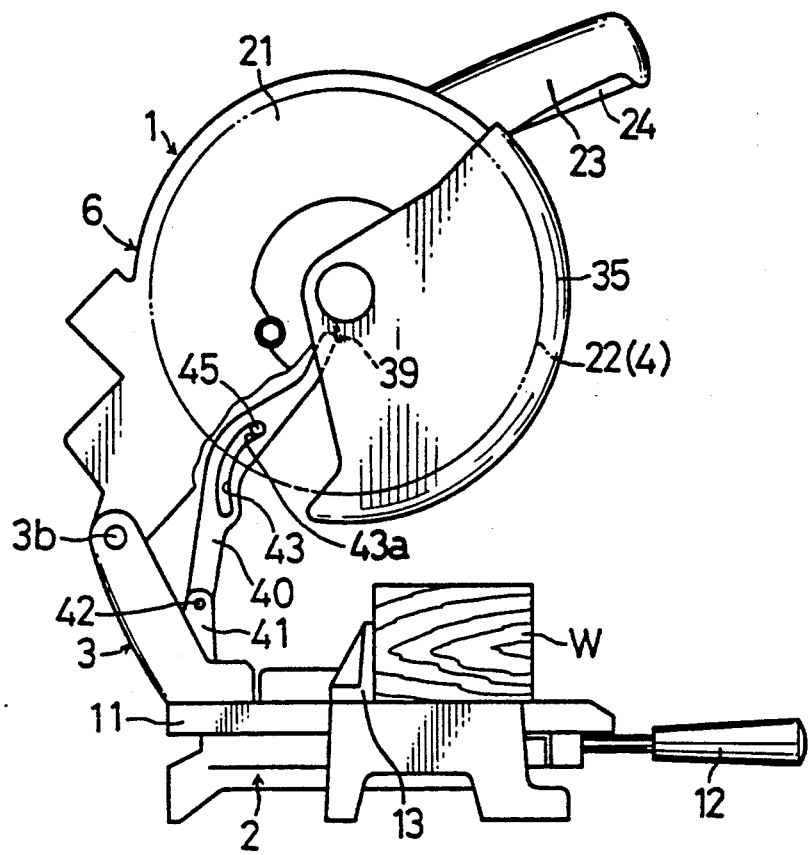
FIGS. 6A to 6D are views showing various operational positions of the safety cover.
Figure 6B:
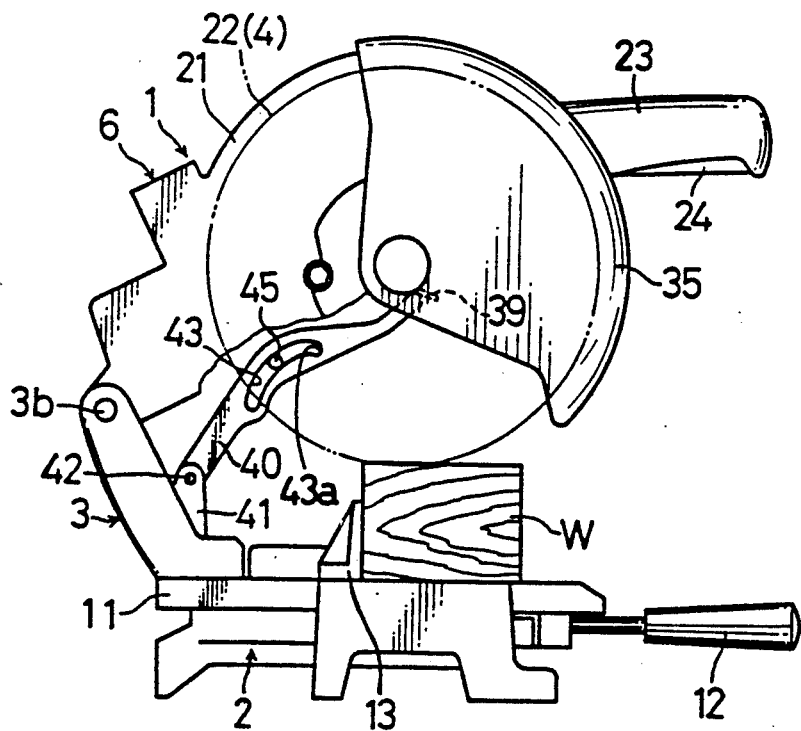
Figure 6C:
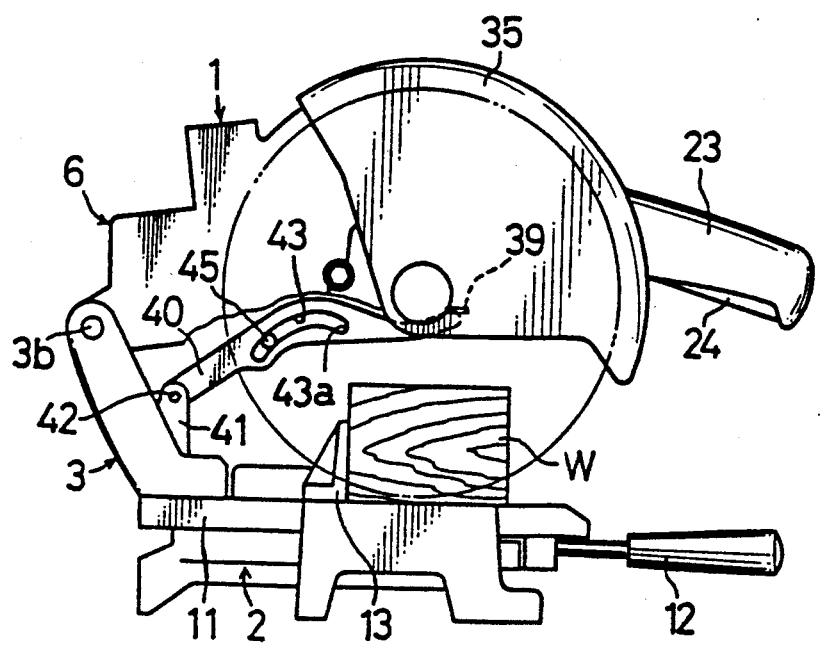
Figure 6D:
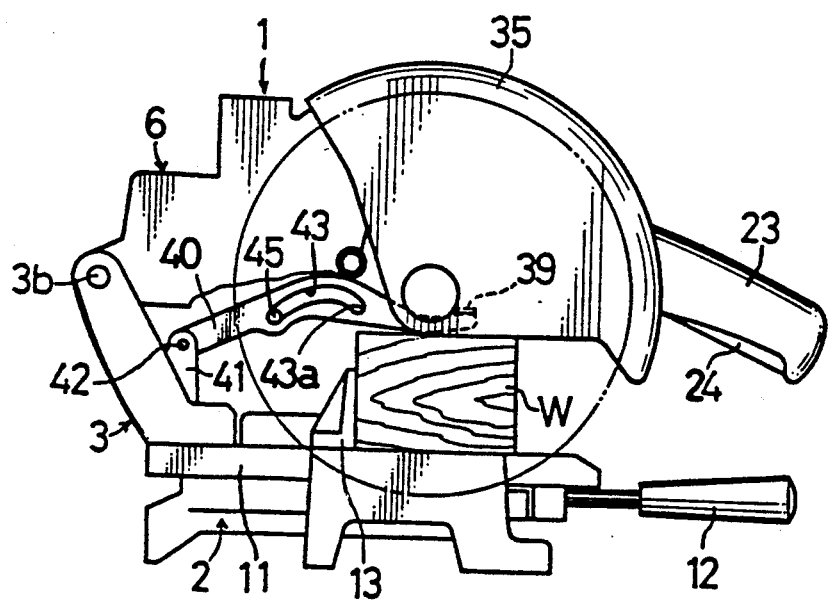
Figure 9:
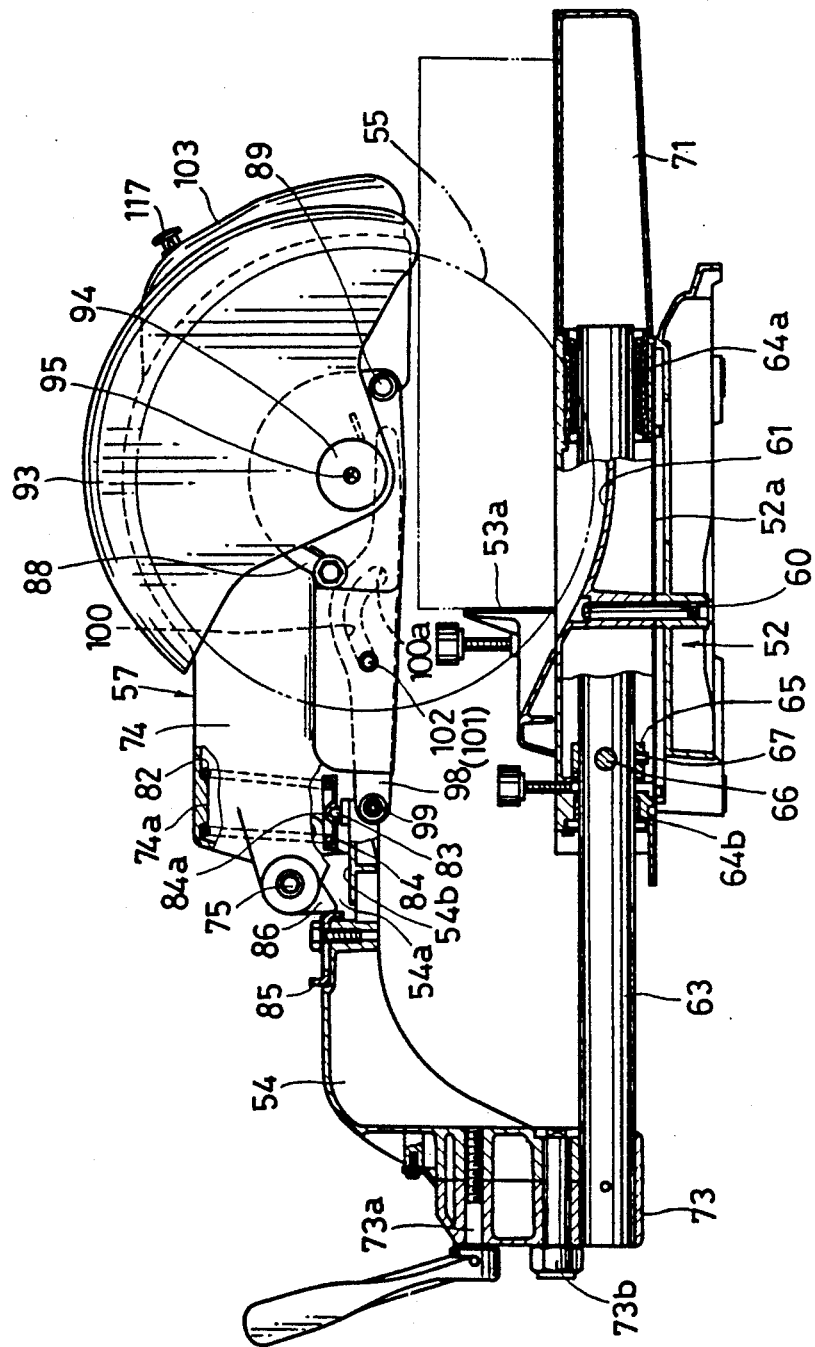
FIG. 9 is a front view similar to FIG. 8, but showing the miter saw unit in the operational position.

The actuating link 40 imparts rotational force to the mounting cap 34 through the engaging plate 39 as long as the miter saw unit 6 is swung, and the safety cover 35 is positively pivoted to gradually increase the exposed portion of the cutting edge of the circular saw blade 22 so as to proceed with the cutting operation through the engagement of the other portion of the control slot 43 other than the arcuate portion 43a with the guide roller 45 (See FIG. 6C). At this time, the actuating link 40 pivotally moves substantially in proportion to that of the miter saw unit 6.

When the miter saw unit 6 comes near the fully lowered position, the actuating link 40 is brought to a position in which its one end extends in parallel in contact with the engaging plate 39 and does not further push the engaging plate 39, and consequently ceases to impart rotational force to the mounting cap 34, so that the safety cover 35 is maintained in the pivoted position. Only the swinging movement of the miter saw unit 6 is continued, until the cutting operation is completed (See FIG. 6D).

As the cutting operation for the workpiece W is completed and the miter saw unit 6 is released from its swinging movement, the miter saw unit 6 is pivotally returned to its original position under the returning resilient force of the compression spring 25. As this occurs, the safety cover 35 is pivotally returned to its original position under the biasing force of the spring 38 so as to cover from outside of the blade case 21 the exposed portion of the saw blade 22 from the blade case 21.

As the miter saw unit 6 and the safety cover 35 are pivoted to their respective original positions, the actuating link 40 is returned to its original position At this time, the compression spring 25 is distorted to recover its shape under its returning resilient force, but as the bearing member 27 holding the lower end of the spring 25 is pivotally supported by the support pin 26 for swinging movement in a plane, it can be pivoted in response to any distortion of the compression spring 25 so as to hold the whole lower end surface of the compression spring 25 at all times.

As described above, in the above embodiment, the vertically swinging movement of the miter saw unit 6 causes distortion of the whole compression spring 25, but as the support member 27 holding the lower end of the spring 25 is pivotally supported by the support pin 26 for swinging movement in a plane, it can be pivoted in response to any distortion of the spring 25 so as to hold the whole lower end surface of the spring 25 at all times.

Therefore, the resilient force is effectively imparted to the miter saw unit 6, so that vertically swinging movement of the miter saw unit 6 can be performed smoothly.

Further, as the miter saw unit 6 is vertically swung, the safety cover 35 covering the circular saw blade 22 is positively pivoted in response to the swinging movement of the miter saw unit 6 associated with the cutting operation by the saw blade 22. Such pivotal movement of the safety cover 35 is performed by the pivotal movement of the actuating link 40 through the movement of the engaging position of the control slot 43, so that the cutting operation can be performed smoothly and safely.

Referring now to FIGS. 7 to 15, a miter saw in accordance with a second embodiment of the present invention will be described.

The miter saw 51 is mainly comprised of a base having a fixed base body 52 on which a workpiece W is to be carried, a turntable 53 disposed on the fixed base body 52 and a movable arm 54 attached to a slide bar which is slidable relative to the turntable 53, and a miter saw unit 57 connected to a movable arm 54 pivotally along a vertical path relative to the turntable 53. The miter saw unit 57 includes drive means 56 for driving a rotary tool 55 such as a circular saw blade.

As shown in FIGS. 7 to 10, the fixed base body 52 is formed substantially in the central portion thereof with a mounting cavity 58 for mounting the turntable 53. The fixed base body 52 has a bottom and is opened upwardly and in the front and rear sides. The rectangular projections 59 are formed with the fixed base body 52 in the left and right sides of the mounting cavity 58 and are provided with upper surfaces which constitute workpiece supporting surfaces 59a.

The turntable 53 is a disc-like member and is received in the mounting cavity 58 of the fixed base body 52 on the bottom thereof. A locking bolt 60 is threaded vertically upwardly from under the bottom of the mounting cavity 58 in the substantially central portion of the turntable 53, so that the turntable 53 may be mounted in the mounting cavity 58 rotatably in a desired range relative to the fixed base body 52. The turntable 53 has at the front and rear ends thereof straightly cut-out end surfaces corresponding to the front and rear portions of the mounting cavity 58 and an upper surface of the turntable 53 positioned in the same plane as the workpiece supporting surfaces 59a of the projections 59.

The turntable 53 is formed in the upper surface thereof with a cut-out recess 61 extending substantially from the central portion thereof to the front end and adapted to permit intrusion of the rotary tool 55. A tuyere plate 62 is fitted on the upper surface of the out-out recess 61 to define an opening having a width corresponding to the rotary tool 55.

A cylindrical slide bar 63 is provided within the turntable 53, extending diametrically of the turntable 53 at a position spaced a predetermined distance away from the cut-out recess a first bearing set 64a composed of a linear ball bearing located adjacent the front end of the slide bar 63 and a second bearing set 64b composed of a bearing metal located adjacent the rear end, so that the slide bar 63 may be slidable in the diametrical direction of the turntable 53.

A lock ring 65 is fitted on the slide bar 63 rotatably in the circumferential direction of the slide bar 63. A support shaft 66 is inserted rotatably about its axis into the lock ring 65 and the slide bar 63 in the diametrical direction thereof. A set bolt 67 is threaded in the periphery of the lock ring 65 and adapted to be fastened to fix the lock ring 65 and the support shaft 66 to the slide bar 63. The support shaft 66 has one end on which is fitted a first guide bearing 68 having a center positioned in a alignment with the central axis of the support shaft 66 and on which is also fitted a second guide bearing 69 located outside of the first guide bearing 68 and slightly eccentrically from the center of the first guide bearing 68. The first and second guide bearings 68 and 69 of this arrangement are rotatably received in a guide rail 70 provided in the turntable 53 and extending in parallel and in spaced relation to the slide bar 63. Specifically, as shown in FIG. 12, the guide rail 70 includes a long metal plate 70a defining an upper rail surface in the turntable 53 on the bottom surface thereof and a long guide plate 70d fixedly secured through a plurality of sleeves 70b and bolts 70c to the metal plate 70a in spaced and opposed relation thereto so as to define a lower rail surface. The first guide bearing 68 and the second guide bearing 69 are assembled to be rotatingly moved along the upper rail surface defined by the metal plate 70a and along the lower rail surface defined by the guide plate 70d, respectively. This arrangement can effectively prevent rotation of the slide bar 63 about its axis and rattling thereof caused by diametrical movement or sliding of the slide bar 63 in relation to the turntable 53. The space between the upper rail surface defined by the metal plate 70a and the lower rail surface defined by the guide plate 70d is set to be slightly larger than the outer diameter of the guide bearing 68 and 69 and slightly smaller than the total of the outer diameter of the guide bearings 68 and 69 and the eccentric distance therebetween. In assembling, the support shaft 66 is pivoted about its axis, with the first and second guide bearings 68 and 69 being assembled to be rotatingly moved along the upper rail surface defined by the metal plate 70a and along the lower rail surface defined by the guide plate 70d. Then, the set bolt 67 is threadedly fastened to fix the lock ring 65 and the support shaft 66 to the slide bar 63. A cover plate 52a is provided between the turntable 53 and the base body 52 to cover a half portion of the turntable in which the slide bar 63 is disposed, so that the first and second bearing sets 64a and 64b, the guide rail 70 and the first and second bearings 68 and 69 may be kept free from dirt and dust. A fence member 53a is mounted on the upper surfaces of the fixed base body 52 and the turntable 53.

A protection cover 71 is attached to the front end surface of the turntable 53 in alignment with the slide bar 63 so as to cover a portion of the slide bar 63 projecting beyond the turntable 53. The protection cover 71 is a substantially box-like member of a synthetic resin having an upper surface positioned substantially in the same plane as the upper surface of the turntable 53. The protection cover 71 includes a cut-out groove 72 extending in alignment with the opening defined in the tuyere plate 62 fitted on the cut-out recess 61.

The slide bar 63 has a rear end projecting beyond the rear end of the turntable 53, and a fixed bracket 73 is vertically mounted on the rear end of the slide bar 63. The movable arm 54 generally of an arcuate configuration extends in parallel to the slide bar 63 and upwardly away from the turntable 53. The movable arm 54 is connected to the fixed bracket 73 through a support bolt 73b at a position slightly transversely and upwardly offset from the mounting position of the slide bar 63 for pivotal movement in the direction (left in FIG. 10) perpendicular to the axis of the slide bar 63. The movable arm 54 can be kept at a position relative to the fixed bracket 73 by a locking bolt 73a having a lever which is inserted through the fixed bracket 73 and is threaded in the movable arm 54. The movable arm 54 is formed with two brackets 54a projecting substantially from the front upper end thereof. A unit housing 74 of the miter saw unit 57 is vertically pivotally supported at the rear end thereof through a support shaft 75 between the upper ends of the brackets 54d.

Figure 10:
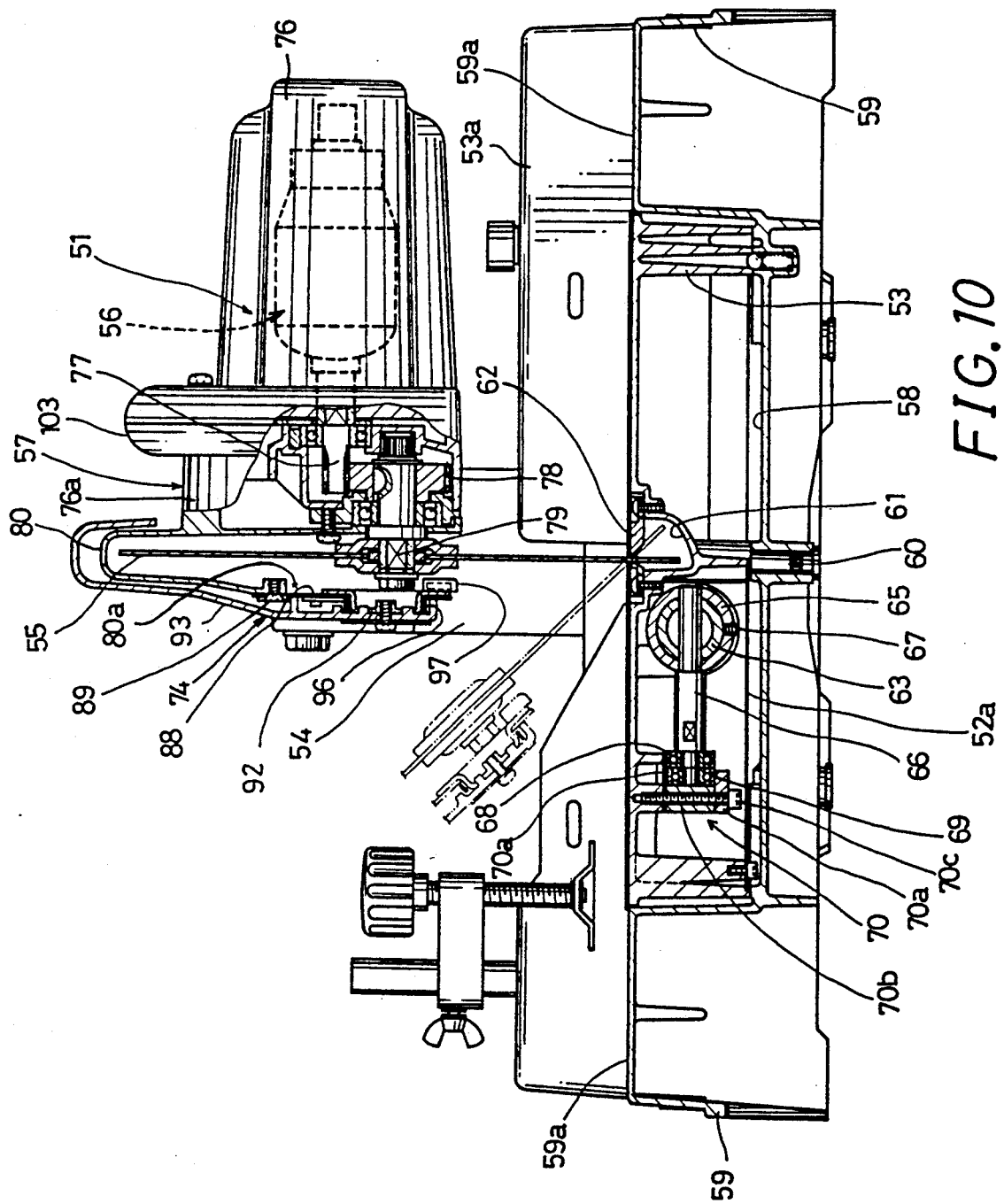
FIG. 10 is a side view partly in section of the miter saw shown in FIG. 7.
Figure 11:
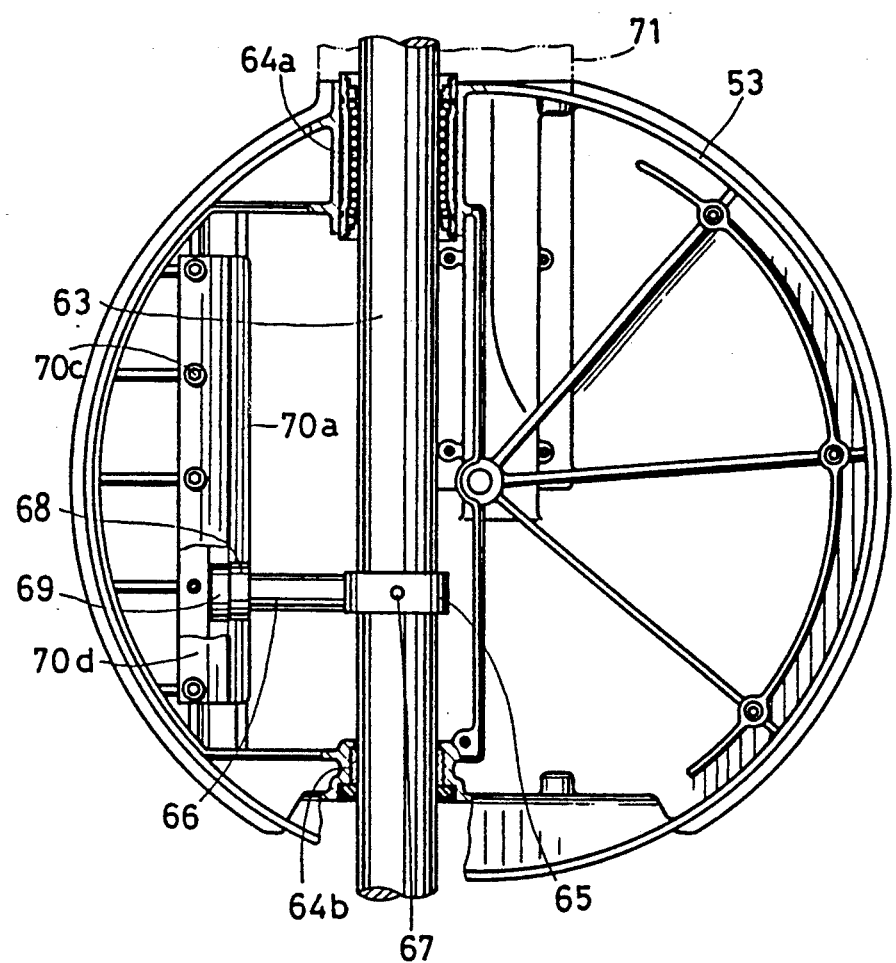
FIG. 11 is a bottom view partly in section of the turntable of the miter saw shown in FIG. 7

A motor housing 76 is mounted on the unit housing 74 of the miter saw unit 57 perpendicularly to the unit housing 74 or longitudinally of the base body 52, and an electric motor constituting the drive means 56 is encased in the motor housing 76 as shown in FIG. 10. The motor has a motor shaft 77 extending into a gear housing 76a attached to the motor housing 76 in which the motor shaft 77 is in mesh with a reduction gear 78. The reduction gear 78 has an output shaft 79 extending into a blade case 80 attached to the gear housing 76a in which the rotary tool or a circular saw blade 55 is exchangeably mounted on the end of the output shaft 79. The blade case 80 is so designed as to cover substantially half the rotary tool 55.

The unit housing 74 of the miter saw unit 57 has a rear end portion in form of a box having an open bottom and formed at the upper inside wall with an integrally formed spring support 74a substantially in form of a boss. A compression spring 82 is disposed within the unit housing 74 at the rear end thereof so as to normally urge the miter saw unit 57 for upward swinging movement. The compression spring 82 extends in the direction of the swinging movement. The compression spring 82 has one end (upper end in FIG. 8) loosely supported by the spring support 74a and the other end (lower end in FIG. 8) held by the upper surface of a dish-like support member 84. The support member 84 is supported by a support pin 83 which extends from a front stepped upper surface 54b of the movable arm 54 through a bracket. As shown in FIG. 8, the support member 84 is formed at the central portion of the lower surface thereof with a semispherical recess 84a in which a semispherical upper end of the support pin 83 is fitted. With this arrangement, the support member 84 holding the lower end of the compression spring 82 is pivotally supported for swinging movement in a plane relative to the support pin 83 in response to the movement of the compression spring 82. A stopper 85 is mounted on the front stepped portion of the movable arm 54 through a bolt 85a, so that the length of projection rightwardly in FIG. 8 can be adjustable. An abutment 86 is mounted on the support shaft 75 of the unit housing 74 and has a tapered extreme end which may be brought in abutting engagement with the stopper 85 so as to restrict the extent of the downward swinging movement of the miter saw unit 57. The extent of the upward swinging movement of the miter saw unit 57 is restricted by an arrangement comprising a control slot 100 formed in an actuating link 98 which will he described later and a guide roller 102 supported in the control slot 100 through a support shaft 101, substantially as shown in FIG. 8.

The unit housing 74 has two through holes 87 which are similar to the through holes 29 of the first embodiment and are disposed substantially below the compression spring 82. These through holes 87 are used for assembling the compression spring 82 as described in the first embodiment, As shown in FIGS. 8, 10 and 14, the blade case 80 has a cutout portion 80a formed generally in opposed relation to the central mounting portion of the saw blade 81. A substantially elliptical mounting plate 88 is provided generally in opposed relation to the cutout portion 80a and is adapted to mount a safety cover which will be described later. Specifically, the mounting plate 88 is pivotally supported at one end to the blade case 80 through a support screw 89, and the other end of the mounting plate 88 forms a hooked engaging portion 90 which is releasably fastened to the blade case 80 by a locking bolt 91. The mounting plate 88 has a large-diameter central opening 88a formed in alignment with the central mounting portion of the saw blade 81. A mounting cap 92 serving as a central cap is rotatably fitted in the opening 88a. The mounting cap 92 has a flange portion 92b disposed in abutment with the rear surface of the mounting plate 88 and a boss portion 92a projecting outwardly through the opening 88a. A substantially sectorial safety cover 93 is provided and is adapted to cover from outside of the blade case 80 a portion of the saw blade 81 exposed from the blade case 80. Specifically, the safety cover 93 has a central mounting portion and an inwardly bent portion 93a formed at the end thereof, and is fixedly fastened to the mounting cap 92 through a washer 94 by a screw 95, having the central mounting portion disposed in abutment with the front surface of the boss portion 92a of the mounting cap 92 and the bent portion 35a in contact with the mounting plate 88. With this arrangement, the safety cover 93 is pivotal along with the mounting cap 92 about the opening 88a of the mounting plate 88 relative to the blade case 80. The boss portion 92a of the mounting cap 92 is encircled by a spiral spring 96 having one end fixed to the mounting plate 88 and the other end to the safety cover 93 and adapted to impart to the safety cover 93 biasing force in the clockwise direction in FIG. 8 to cause swinging return movement thereof, so that the safety cover 93 may normally cover from outside of the blade case 80 the portion of the saw blade 81 exposed from the blade case 80.

The mounting cap 92 is provided at the rear surface of the flange portion 92b with an engaging plate 97 projecting therefrom and adapted to be abuttingly engaged with one end of the actuating link 98. Specifically, as shown in FIGS. 8 and 14, the actuating link 98 has the one end located in the blade case 80 in opposed relation to the engaging plate 97 so as to be brought in abutting engagement therewith and the other end pivotally connected through a support pin 99 to the extreme end of the front stepped upper surface 54b of the movable arm 54. The actuating link 98 has substantially in the central portion thereof an arcuate control slot 100 which extends in the longitudinal direction of the actuating link 98 and is curved upwardly with respect to the pivotal direction of the actuating link 98. A guide roller 102 is supported by the blade case 80 through a support shaft 101 and rotatably fitted in the control slot 100. The control slot 100 has at one end thereof an arcuate portion 100a whose radius of curvature is smaller than that of the other arcuate portion. As the unit housing 74 of the miter saw unit 57 is pivotaly lowered, the actuating link 98 thus constructed is pivoted about the support pin 99 by the movement of the engaging position of the control slot 100 with the guide roller 102 and, through the one end of the actuating link 98 in abutting engagement with the engaging plate 97 of the mounting cap 92, the actuating link 98 causes the safety cover 93 along with the mounting cap 92 to be pivoted counterclockwise in FIG. 8 against the biasing force of the spiral spring 96, so that the cutting edge of saw blade 81 is exposed.

The motor housing 76 is formed with a control handle 103 which projects from a portion of the periphery thereof in the same direction as the unit housing 74 and has both ends integral with the periphery of the motor housing 76. The control handle 103 is provided with a trigger for actuating a switch (not shown) to start or stop the electric motor.

The operation of the sliding miter saw 51 thus constructed will now be described as to the forced cutting operation which is a typical function of the miter saw 51.

With the miter saw 51 in the position shown in FIG. 8, a workpiece W to be cut is put on the turntable 53 and the base body 52 and properly clamped by clamping means.

When the miter saw unit 57 is in its uppermost position relative to the movable arm 54 (FIG. 15A), the operator draws the miter saw unit 57 through the control handle 103 in the forward direction of the turntable 53 (right in FIG. 8), so that the slide bar 63 connected as a unit to the miter saw unit 57 through the movable arm 54 and the fixed bracket 73 is slidingly advanced in the forward direction of the turntable 53, guided in relation to the turntable 53 by the first and second guide bearings 68 and 69 rotatingly moved along the guide rail 70 (See phantom lines in FIG. 8).

In this condition, the front end of the slide bar 63 is largely projected beyond the front end surface of the turntable 53, but as the projected front end is completely protected by the protection cover 71, it will cause no danger to the operator.

When the trigger mounted on the control handle 103 is depressed to turn on the switch for starting of the electric motor or the drive means 56 and the miter saw unit 57 is lowered or pushed down through the control handle 103 toward the turntable 53, the compression spring 82 is further compressed and the miter saw unit 57 is swung relative to the movable arm 54 toward the turntable 53 along a pivotal path about the support shaft 75.

During this movement, the compression spring 82 is wholly so deformed as to be further compressed. As the support member 84 holding the lower end of the spring 82 is pivotally supported by the support pin 83 for swinging movement in a plane, it can be pivoted in response to any distortion of the compression spring 82 so as to hold the whole lower end surface of the compression spring 82 at all times.

As the miter saw unit 57 is swung, the actuating link 98 is pivoted in the same direction about the support pin 99 under the control of the guide roller 102 fitted in the control slot 100. When the miter saw unit 57 is downwardly swung from the position shown in FIG. 15A, since the arcuate portion 100a of the control slot 100 at the one end thereof is smaller in radius of curvature than the other arcuate portion, the pivotal movement of the actuating link 98 is performed rapidly through a large angle. As the pivoting actuating link 98 has the on end kept in abutting engagement with the engaging plate 97 of the mounting cap 92, the pivotal movement of the actuating link 98 causes the engaging plate 97 to be pushed to impart rotational force to the mounting cap 92, so that the safety cover 93 along with the mounting cap 92 is pivoted counterclockwise in FIG. 8 about the opening 88a of the mounting plate 88 against the biasing force of the spiral spring 96. Thus, the cutting edge of the circular saw blade 81 is widely exposed for starting the cutting operation (FIG. 15B).

The actuating link 98 imparts rotational forth to the mounting cap 92 through the engaging plate 97 as long as the miter saw unit 57 is swung, and the safety cover 93 is positively pivoted to gradually increase the exposed portion of the cutting edge of the circular saw blade 81 so as to proceed the cutting operation through the engagement of the other portion of the control slot 100 than the arcuate portion 100a with the guide roller 102. At this time, the actuating link 98 pivotally moves in substantially proportional to that of the miter saw unit 57.

Figure 15A:
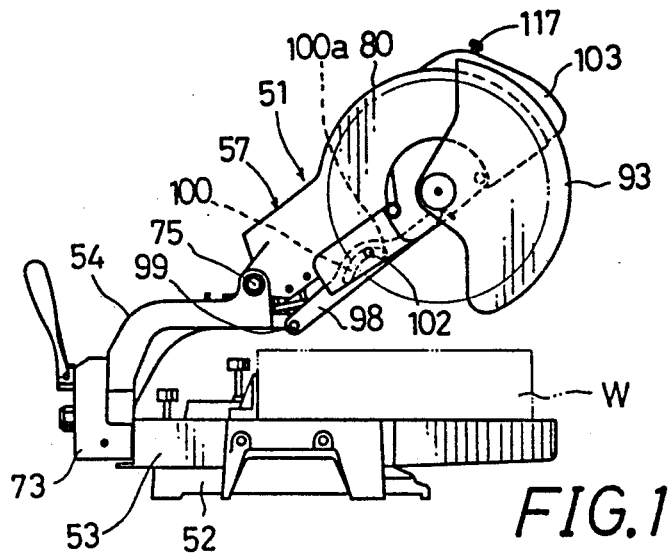
FIGS. 15A to 15C are views showing various operational positions of the safety cover of the miter saw shown in FIG. 7.
Figure 15B:
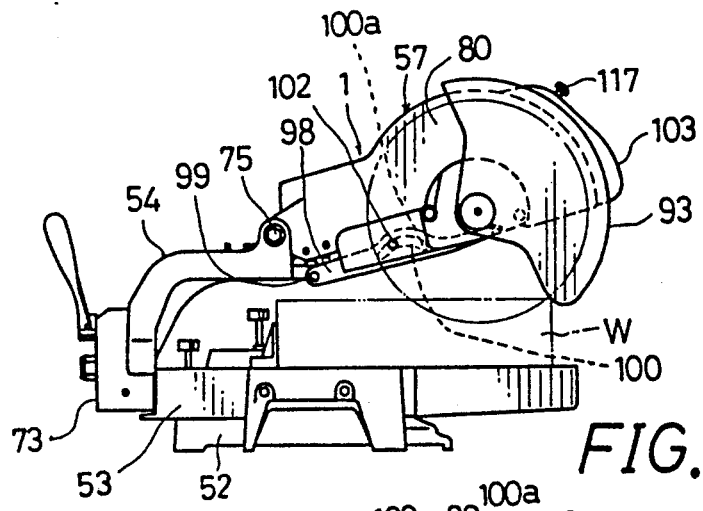

When the miter saw unit 57 comes near the fully lowered position, the actuating link 98 has its one end extending in parallel in contact with the engaging plate 97 and no further pushes the engaging plate 97, and consequently ceases to impart rotational force to the mounting cap 92, so that the safety cover 93 is maintained in the pivoted position (FIG. 15B).

In this condition, the operator then pushes the miter saw unit 57 through the control handle 103 in the backward direction of the turntable 53 (left in FIG. 8), so that the slide bar 63 is slidingly moved backward of the turntable 53, guided relative to the turntable 53 by the first and second guide bearings 68 and 69 rotatingly moved along the guide rail 70 and the saw blade 81 is moved backward along therewith to complete the forced cutting operation.

Figure 15C:
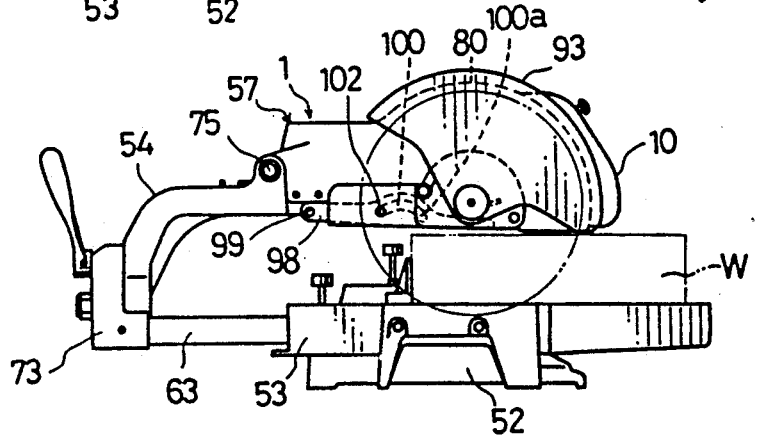

At this time, safety cover 93 is out of restriction by the actuating link 98 and, with the end riding on the upper surface of the workpiece W, is independently pivoted in abutment with the upper surface of the workpiece W and moved backward along with the miter saw unit 57 (FIG. 15C).

As the cutting operation for the workpiece W is completed and the miter saw unit 57 is released from its swinging movement, the miter saw unit 57 is pivotally returned to its original position under the returning resilient force of the compression spring 82. As this occurs, the safety cover 93 is pivotally returned to its original position under the biasing force of the spring 96 so as to cover from outside of the blade case 80 the exposed portion of the saw blade 81 from the blade case 80.

As the miter saw unit 57 and the safety cover 93 are pivoted to their respective original positions, the actuating link 98 is returned to its original position. At this time, the compression spring 82 is distorted to recover its shape under its returning resilient force, but as the support member 84 holding the lower end of the spring 82 is pivotally supported by the support pin 83 for swinging movement in a plane, it can be pivoted in response to any distortion of the compression spring 82 so as to hold the whole lower end surface of the compression spring 82 at all times.

In the above embodiment, usual cutting operation other than the forced cutting can be also performed in the same way as that in the first embodiment.

As with the first embodiment, in the above embodiment, the support member 84 can be pivoted in response to any distortion of the compression spring 82 so as to hold the whole lower end surface of the compression spring 82 at all times.

Therefore, the resilient force is effectively imparted to the miter saw unit 57, so that vertically swinging movement of the miter saw unit 57 can be performed smoothly. Furthermore, as the miter saw unit 57 is vertically swung, the safety cover 93 covering the circular saw blade 81 is positively pivoted in response to the swinging movement of the miter saw unit 57 associated with the cutting operation by the saw blade 81, so that the forced cutting operation through sliding of the slide bar 63 can be performed effectively and safely.

In the above embodiments, the safety covers 35, 93 are positively pivoted through the engagement of the control slots 43, 100 of the actuating link 40, 98 with the guide member. The actuating link 40, 98 are simple in construction, so that the pivotal movement of the safety covers 35, 93 can be performed smoothly. Further, the actuating link 40, 98 can be easily assembled.

Although in the above embodiments, the safety covers 35, 93 are pivoted against the springs 38, 96 through a forward movement of the the actuating links 40, 98 toward the safety covers 35, 93, respectively, the safety covers 35, 93 may be pivoted by the rearward movement of the actuating links 40, 98. In this case, the actuating link 40, 98 are engaged with the safety covers 35, 93 or the mounting caps 36, 94 in such a manner that the safety covers 35, 93 can be pivoted against the springs 38, 96 by the rearward movement of the actuating links 40, 98. The rearward movement of the actuating link 40, 98 can be performed by modifying the control slots 43, 100 in an appropriate configuration such as a downwardly curved configuration with respect to the pivotal direction of the miter saw units 6, 57. Further, in this case, the actuating link 40, 98 may be pivotally mounted on their corresponding arms 3, 54 at upper portions thereof, preferably above the fulcrum points of the miter saw units 6, 57

While the invention has been described with reference to preferred embodiments thereof, it is to be understood that modification or variations may be easily made without departing from the scope of the present invention which is defined by the appended claims.

What is claimed is:

1. A miter saw comprising:
   a base on which a workpiece is placed;
   a miter saw unit substantially vertically pivotally mounted on said base;
   drive means supported by said miter saw unit for driving a rotary tool;
   a blade case mounted on said miter saw unit and partly covering said rotary tool so as to provide an exposed operational portion of said rotary tool;
   a safety cover pivotally mounted on said blade case for covering the exposed operational portion of said rotary tool;
   an actuating link having a slot formed substantially in the central portion thereof, one end of said actuating link being pivotally connected with said base, while the other end of said actuating link being engaged with said safety cover; and
   a guide member mounted on said blade case and being engaged with said slot of said actuating link;
   whereby said safety cover is pivoted to uncover the exposed operational portion of said rotary tool in association with the movement of the engaging position of said slot with said guide member as said miter saw unit is pivoted downwardly toward said base.

2. The miter saw as defined in claim 1 wherein said other end of said actuating link is extended adjacent said safety cover and wherein said safety cover is biased by a spring in a direction in which the range of covering the exposed operational portion of said rotary tool is increased so as to engage said other end of said actuating link, so that said safety cover is pivoted to uncover the exposed operational portion of said rotary tool against the biasing force of said spring as said miter saw unit is pivoted downwardly.

3. The miter saw as defined in claim 2 wherein said blade case includes a cutout portion formed generally in opposed relation to the central portion of said rotary tool and further including;

a mounting plate releasably mounted on said blade case so as to open or close said cutout portion and having an opening formed in opposed relation to said central portion of said rotary tool, said spring being a spiral spring one end of which is fixed to said mounting plate and the other end of which is fixed to said safety cover;

a mounting cap pivotally fitted in said opening of said mounting plate, said safety cover being mounted on said mounting cap so as to pivot therewith; and an engaging plate fixed to said mounting cap for abutting engagement with said other end of said actuating link.

4. The miter saw as defined in claims 1 wherein said slot extends substantially in a longitudinal direction of said actuating link and is curved upwardly with respect to the pivotal direction of said miter saw unit.

5. The miter saw as defined in claim 4 wherein said slot is formed on the side of said other end of said actuating link with a portion which is smaller in radius of curvature than another portion of said slot.

6. The miter saw as defined in claim 1 wherein said guide member is a roller rotatably mounted on said blade case through a support shaft.

* * * * *